US008344938B2

(12) United States Patent
Leferink

(10) Patent No.: US 8,344,938 B2
(45) Date of Patent: Jan. 1, 2013

(54) SYSTEM TO PREVENT TWO ROTATING ANTENNAS FROM ILLUMINATING EACH OTHER

(75) Inventor: Frank Leferink, De Lutte (NL)

(73) Assignee: Thales Nederland B.V., GD Hengelo (NL)

( * ) Notice: Subject to any disclaimer, the term of this patent is extended or adjusted under 35 U.S.C. 154(b) by 255 days.

(21) Appl. No.: 12/788,691

(22) Filed: May 27, 2010

(65) Prior Publication Data

US 2011/0050483 A1    Mar. 3, 2011

(30) Foreign Application Priority Data

May 27, 2009   (EP) ..................................... 09161271

(51) Int. Cl.
*G01S 13/00* (2006.01)
*G01S 13/93* (2006.01)
(52) U.S. Cl. ............... 342/59; 342/41; 342/74; 342/159
(58) Field of Classification Search .................... 342/74, 342/75, 59, 159, 41
See application file for complete search history.

(56) References Cited

U.S. PATENT DOCUMENTS

| 3,772,692 | A | * | 11/1973 | Braddon ........................ 342/41 |
|---|---|---|---|---|
| 3,815,131 | A | | 6/1974 | Turner et al. ................... 342/28 |
| 3,870,992 | A | * | 3/1975 | Hanna, Jr. ...................... 342/58 |
| 3,893,116 | A | * | 7/1975 | Hudspeth et al. ............. 342/150 |
| 4,061,415 | A | * | 12/1977 | Taenzer ...................... 359/212.2 |
| 4,612,547 | A | * | 9/1986 | Itoh ............................... 342/372 |
| 5,497,162 | A | | 3/1996 | Kaiser .......................... 342/159 |
| 6,043,770 | A | * | 3/2000 | Garcia et al. ................... 342/13 |
| 6,388,629 | B1 | * | 5/2002 | Albats et al. .................. 343/757 |
| 2002/0105469 | A1 | * | 8/2002 | Albats et al. .................. 343/719 |
| 2002/0175852 | A1 | * | 11/2002 | Zoratti et al. ................... 342/70 |
| 2005/0231420 | A1 | * | 10/2005 | Brookner et al. .............. 342/59 |
| 2006/0132357 | A1 | * | 6/2006 | Pozgay et al. ................. 342/174 |
| 2006/0220951 | A1 | * | 10/2006 | Thome et al. ................. 342/174 |
| 2006/0262009 | A1 | * | 11/2006 | Watanabe et al. ............. 342/159 |
| 2007/0257856 | A1 | * | 11/2007 | Peterson ....................... 343/840 |
| 2011/0050483 | A1 | * | 3/2011 | Leferink ........................ 342/59 |

FOREIGN PATENT DOCUMENTS

| EP | 1990651 | 11/2008 |
|---|---|---|
| JP | 11-183614 | 7/1999 |

* cited by examiner

*Primary Examiner* — John B Sotomayor
(74) *Attorney, Agent, or Firm* — Stroock & Stroock & Lavan LLP

(57) ABSTRACT

An apparatus or a method for preventing radio-frequency (RF) interferences between rotating antennas. For example, the invention is particularly applicable to radar and communication systems on board naval ships.

6 Claims, 2 Drawing Sheets

SYSTEM TO PREVENT TWO ROTATING ANTENNAS FROM ILLUMINATING EACH OTHER

CROSS REFERENCE TO RELATED APPLICATION

Priority is claimed to European Patent Application No. 09161271.3, filed on May 27, 2009, which is hereby incorporated by reference in its entirety.

FIELD OF THE INVENTION

The present invention relates to an apparatus and/or a method for preventing radio-frequency (RF) interferences between rotating antennas. For example, the invention is particularly applicable to radar and communication systems on board naval ships.

BACKGROUND

An antenna which is continuously rotating may result in RF interferences to another rotating antenna operating in the same RF band, when the antennas are illuminating each other. Existing solutions to prevent interferences are based on electromagnetic diversity in the temporal domain, in the spatial domain or in the frequency domain.

In the temporal domain, these solutions propose blanking periods, by switching off the system when its antenna points in the fixed directions of other antennas. However, a major disadvantage of blanking periods is that the system does not provide an overall coverage: data may be missed during the time the radar system is blanked.

In the spatial domain, these solutions propose blanking sectors, by switching off the system when its antenna points in the fixed directions of other antennas. However, a major disadvantage of blanking sectors is that the system does not provide an overall coverage: data may be missed in blanked sectors.

In the frequency domain, these solutions propose using a different frequency for each system on transmits and using filtering means on receive, so as to make interferences impossible. However, a first disadvantage is that the filtering means may not be efficient or involve high cost. Yet another major disadvantage of using different frequencies is that you cannot mix all the systems you want. Especially on a ship, some systems are required, which must operate in the same RF band.

SUMMARY OF THE INVENTION

The present invention aims to provide an apparatus and/or a method which may be used to avoid interferences between rotating antennas operating in the same RF band, by adapting their rotation speed. At its most general, the invention proposes a system comprising a first and a second rotating antenna arranged on a naval ship, the rotation speed of the first antenna varying so as to prevent the two antennas from illuminating each other simultaneously and provide a full coverage.

In a preferred embodiment, the system may comprise means to adapt the rotation speed of the first antenna, said means comprising means to predict, based on the current shift angle between the two antennas and on their current rotation speeds, when the two antennas are likely to illuminate each other simultaneously. The means to adapt the rotation speed of the first antenna may then decrease the rotation speed in order to prevent the two antennas from illuminating each other simultaneously.

Advantageously, the first antenna being started at a given initial rotation speed, the means to adapt the rotation speed of the first antenna may increase the rotation speed back to the initial rotation speed when the two antennas are not likely to illuminate each other simultaneously anymore.

In a preferred embodiment, the two antennas being shifted at starting by an angle, the system may comprise means to adapt the rotation speed of the first antenna, said means comprising means to measure the shift angle between the two antennas. The means to adapt the rotation speed of the first antenna may then modify the rotation speed in order to maintain the shift angle.

Advantageously, the rotation speeds of the two antennas may be variable.

BRIEF DESCRIPTION OF THE DRAWINGS

Non-limiting examples of the invention are described below with reference to the accompanying drawing, in which the FIGS. 1a, 1b and 1c are schematic diagrams illustrating a system to prevent two rotating antennas from illuminating each other.

In the figures, like reference signs are assigned to like items.

DETAILED DESCRIPTION

Figure 1A:
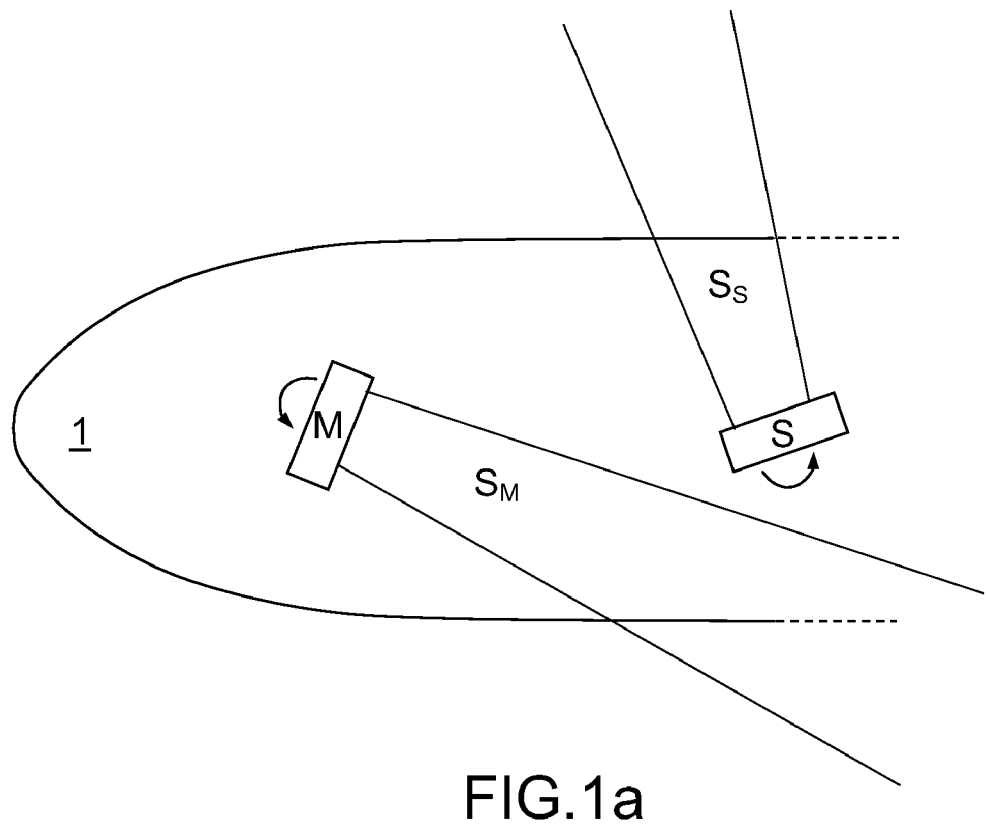

FIG. 1a schematically illustrates by a top view an exemplary embodiment of the invention on a naval ship 1. For example, a master radar antenna M may be arranged on the deck of the naval ship 1, the master radar antenna M rotating anticlockwise around its vertical axis. For example, the antenna M may rotate at 27 rpm (round-per-minute). The antenna M emits a signal $S_M$. The master antenna M may comprise a position encoder, which may be arranged below the deck and thus is not illustrated on FIG. 1a. This encoder is usually used to determine the direction in which the signal $S_M$ is emitted, based on the measured pointing angle of the antenna M. For example, a slave radar antenna S may also be arranged on the deck of the naval ship 1, the slave radar antenna S rotating anticlockwise around its vertical axis. For example, the antenna S may rotate at 60 rpm. The antenna S emits a signal $S_S$. The slave antenna S may also comprise a position encoder, which may also be arranged below the deck and thus is not illustrated on FIG. 1a. A dedicated controller, which may be also arranged below the deck and thus is not illustrated on FIG. 1a, may monitor both encoders. For example, the controller may be a simple computer, which may be embedded in the drive control computer of the slave antenna S.

Figure 1B:
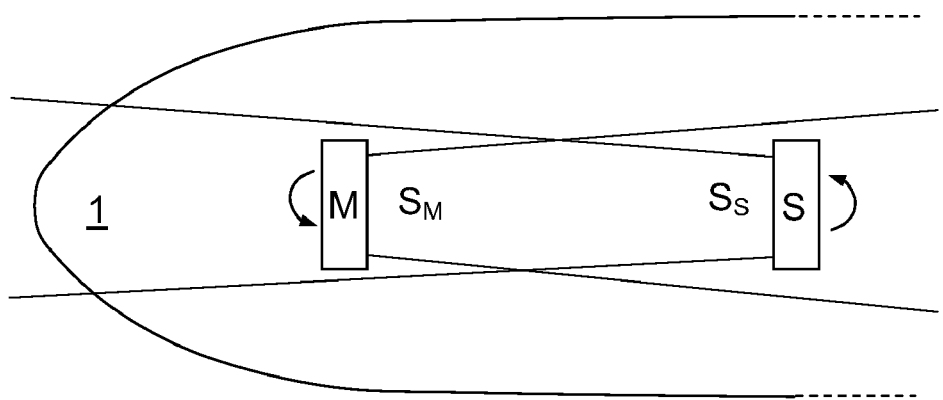

FIG. 1b schematically illustrates by a top view the same exemplary embodiment as FIG. 1a. Advantageously, the controller may continuously predict for the next seconds the position of each antenna with respect to the other. If the controller predicts a forbidden situation, i.e. if the two antennas are likely to illuminate each other simultaneously as illustrated by FIG. 1b, then the controller may slow down the rotation speed of the slave antenna S for approximately 2 seconds, down to 55 rpm for example.

Figure 1C:
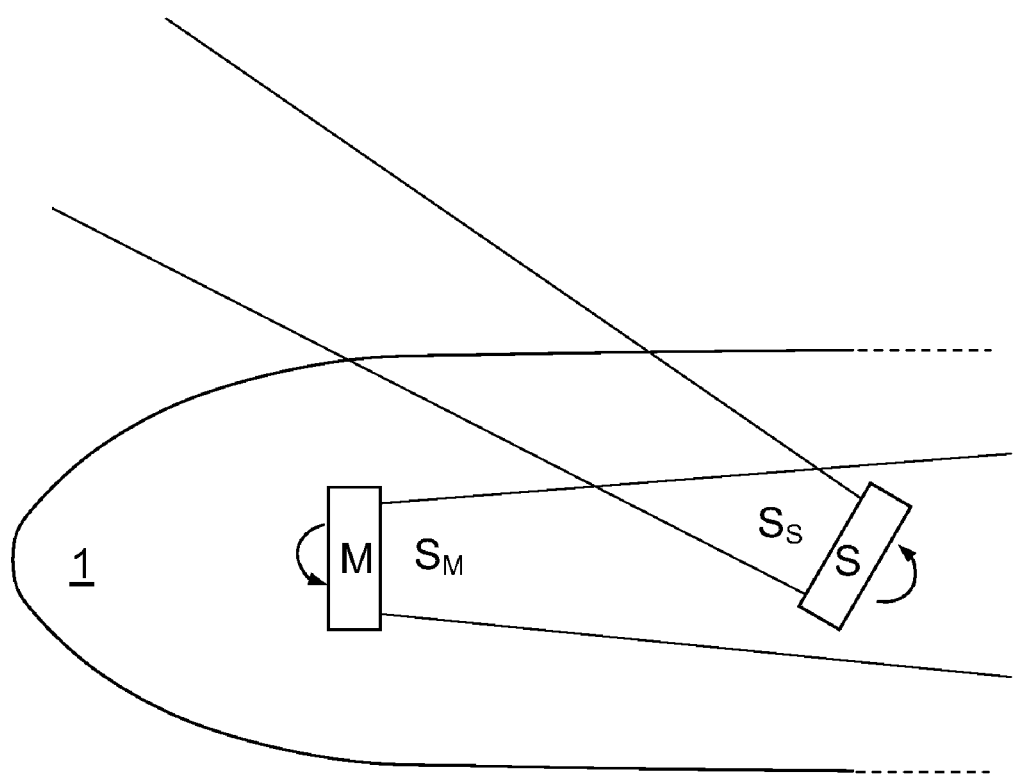

FIG. 1c schematically illustrates by a top view the same exemplary embodiment as FIG. 1a and FIG. 1b. By slowing down the rotation speed of the slave antenna S, the forbidden situation illustrated by FIG. 1b does not occur. The situation illustrated by FIG. 1c occurs instead, in which the two antennas do not illuminate each other simultaneously. In a preferred embodiment, the controller may then speed up the slave antenna S back to its initial rotation speed at 60 rpm, such as to re-establish after a few seconds the initial situation illustrated by FIG. 1a.

In another preferred embodiment, the two antennas S and M may be shifted at starting by an angle and their rotation speeds may be variable. The controller may then periodically speed up or slow down the slave antenna S to maintain the shift angle, based on the pointing angles measured by the encoders.

Hereby, the invention makes it possible to have several rotating antennas which operate in the same RF band on the same ship.

A further advantage provided by the present invention in certain of its embodiments is that there is no need to adapt the signal processing. Thus, the invention can easily be adapted to any system comprising a rotating antenna. In particular, the invention is applicable in the wider application area of netted sensors, in which sensors situated on board ships in a fleet and/or on board aircraft and/or on the ground, operate in the same RF band.

While the invention has been particularly shown and described with reference to preferred embodiments thereof, it will be understood by those skilled in the art that various changes in form and details may be made therein without departing from the spirit and scope of the invention. Accordingly, the invention is to be limited only by the scope of the claims and their equivalents.

The invention claimed is:

1. A system comprising a first rotating antenna and a second rotating antenna, the first rotating antenna and the second rotating antenna arranged on a ship, wherein a rotation speed of the first rotating antenna varies, so as to prevent the first rotating antenna and the second rotating antenna from illuminating each other simultaneously and to provide a full coverage.

2. The system as claimed in claim 1, further comprising a means to adapt the rotation speed of the first rotating antenna, including:
   a means to predict, based on a current shift angle between the first rotating antenna and the second rotating antenna and on current rotation speeds of the first rotating antenna and the second rotating antenna, when the first rotating antenna and the second rotating antenna are likely to illuminate each other simultaneously; and
   a means for decreasing the rotation speed of the first rotating antenna in order to prevent the first rotating antenna and the second rotating antenna from illuminating each other simultaneously.

3. The system as claimed in claim 2, wherein, when the first rotating antenna is started at an initial rotation speed, and the means to adapt the rotation speed of the first rotating antenna increases the rotation speed back to the initial rotation speed when the first rotating antenna and the second rotating antenna are not likely to illuminate each other simultaneously.

4. The system as claimed in claim 1, further comprising a means to adapt the rotation speed of the first rotating antenna, including:
   a means to measure a shift angle between the first rotating antenna and the second rotating antenna; and
   a means for adapting the rotation speed of the first rotating antenna for modifying the rotation speed of the first rotating antenna in order to maintain the shift angle when the first rotating antenna and the second rotating antenna are initially shifted by an angle.

5. The system as claimed in claim 4, wherein rotation speeds of the first rotating antenna and the second rotating antenna are variable.

6. The system as claimed in claim 1, wherein at least one of the first rotating antenna and the second rotating antenna includes a radar antenna.

* * * * *